United States Patent
Tsukamoto

(10) Patent No.: US 10,464,418 B2
(45) Date of Patent: Nov. 5, 2019

(54) TRANSAXLE

(71) Applicant: KANZAKI KOKYUKOKI MFG. CO., LTD., Amagasaki-shi, Hyogo (JP)

(72) Inventor: Michio Tsukamoto, Morristown, TN (US)

(73) Assignee: KANZAKI KOKYUKOKI MFG. CO., LTD., Amagasaki-Shi, Hyogo (JP)

(*) Notice: Subject to any disclaimer, the term of this patent is extended or adjusted under 35 U.S.C. 154(b) by 2 days.

(21) Appl. No.: 15/897,638

(22) Filed: Feb. 15, 2018

(65) Prior Publication Data

US 2018/0236871 A1    Aug. 23, 2018

Related U.S. Application Data

(60) Provisional application No. 62/460,409, filed on Feb. 17, 2017.

(51) Int. Cl.
| | |
|---|---|
| *B60K 23/08* | (2006.01) |
| *B60K 17/16* | (2006.01) |
| *F16D 43/202* | (2006.01) |
| *F16H 57/037* | (2012.01) |
| *F16D 7/04* | (2006.01) |
| *F16H 57/021* | (2012.01) |

(Continued)

(52) U.S. Cl.
CPC .............. *B60K 23/08* (2013.01); *B60K 17/16* (2013.01); *B60K 17/344* (2013.01); *B60K 17/35* (2013.01); *B60K 23/0808* (2013.01); *F16D 7/044* (2013.01); *F16D 43/2024* (2013.01); *F16H 57/021* (2013.01); *F16H 57/037* (2013.01); *B60K 2023/085* (2013.01); *B60K 2023/0825* (2013.01); *F16H 48/08* (2013.01); *F16H 48/42* (2013.01); *F16H 2048/423* (2013.01)

(58) Field of Classification Search
CPC .. B60K 23/08; B60K 23/0808; B60K 17/344; B60K 17/35; B60K 2023/0816; B60K 2023/0841; F16H 57/037
See application file for complete search history.

(56) References Cited

U.S. PATENT DOCUMENTS

| | | | | |
|---|---|---|---|---|
| 5,916,054 A | * | 6/1999 | Kobayashi | ......... B60K 17/3465 475/220 |
| 2003/0183467 A1 | * | 10/2003 | Kozarekar | ............... B60K 6/22 188/380 |

(Continued)

FOREIGN PATENT DOCUMENTS

JP    2004237859 A    8/2004

*Primary Examiner* — Edwin A Young
(74) *Attorney, Agent, or Firm* — Cantor Colburn LLP

(57) ABSTRACT

A transaxle may include an input shaft including a first shaft and a second shaft; and a torque limiter including an input unit and connected to the other end of the first shaft so as to be relatively non-rotatable, a driven unit connected to a second end of the second shaft so as to be relatively non-rotatable, and a region transmitting a torque between the input unit and the driven unit while limiting the torque to a predetermined value or less. By connecting the input unit and the driven unit of the torque limiter with a one-way clutch, the second shaft is rotatable relative to the first shaft when a rotation direction of the first shaft is a first direction, and the second shaft is non-rotatable relative to the first shaft when the rotation direction is a second direction opposite to the first direction.

3 Claims, 5 Drawing Sheets

(51) Int. Cl.
*B60K 17/344* (2006.01)
*B60K 17/35* (2006.01)
*F16H 48/08* (2006.01)
*F16H 48/42* (2012.01)

(56) References Cited

U.S. PATENT DOCUMENTS

2006/0041346 A1* 2/2006 Sugo ................... B60K 17/35
    701/29.7
2010/0274456 A1* 10/2010 Kondo ................. B60K 23/08
    701/69

* cited by examiner

TRANSAXLE

CROSS REFERENCE TO RELATED APPLICATIONS

The present application claims priority under 35 U.S.C § 119(e) to U.S. provisional application 62/460,409 filed Feb. 17, 2017 the entire contents of which are also incorporated herein by reference.

BACKGROUND

1. Field of the Invention

At least one embodiment of the present application relates to a transaxle.

2. Background

A four-wheel drive type all-terrain vehicle, which transmits power to rear wheels through a rear power transmission shaft and transmits power to front wheels through a front power transmission shaft, is known as disclosed in JP-A 2004-237859 Gazette. In the all-terrain vehicle of JP-A 2004-237859 Gazette, the power is transmitted from each of the front and rear power transmission shafts to a rear axle shaft and a front axle shaft through a front transaxle and a rear transaxle.

A technique of interposing a torque limiter in a power transmission path through which the power is transmitted to the front wheels in order to release a peak torque in the forward direction during a jump is known in the all-terrain vehicle as described above. However, in such a configuration, a large torque is applied to the transaxle of the front wheels when a climb or towing is performed in a backward direction, and sometimes the torque cannot be sufficiently transmitted by operation of the torque limiter.

SUMMARY

At least one embodiment of the present application provides a transaxle that can sufficiently transmit the torque even if the large torque is applied to the transaxle of the front wheels during backward movement.

For achieving the above, at least an embodiment of a transaxle may include: an axle housing; a pair of output shafts rotatably supported by the axle housing; an input shaft including a first shaft rotatably supported by the axle housing, a first end of the first shaft protruding from the axle housing, and a second shaft rotatably supported by the axle housing at a second end of the first shaft on an axis line identical to that of the first shaft, a first end of the second shaft, which is an end opposite to the first shaft, being connected to the output shafts; and a torque limiter including an input unit inserted in a middle position of the input shaft in the axle housing and connected to the other end of the first shaft so as to be relatively non-rotatable, a driven unit connected to a second end of the second shaft so as to be relatively non-rotatable, and a region transmitting a torque between the input unit and the driven unit while limiting the torque to a predetermined value or less, wherein, by connecting the input unit and the driven unit with a one-way clutch, the second shaft is rotatable relative to the first shaft when a rotation direction of the first shaft is a first direction, and the second shaft is non-rotatable relative to the first shaft when the rotation direction is a second direction opposite to the first direction.

In at least an embodiment, in the axle housing, a clutch that switches between connection and disconnection of the first shaft and the torque limiter is interposed between the first shaft and the torque limiter.

For achieving the above, at least an embodiment of a transaxle may include: an axle housing; a pair of output shafts rotatably supported by the axle housing; an input shaft comprising: a first shaft rotatably supported by the axle housing, a first end of the first shaft protruding from the axle housing, and a second shaft rotatably supported by the axle housing at a second end of the first shaft on an axis line identical to that of the first shaft, a first end of the second shaft, which is an end opposite to the first shaft, being connected to the output shafts; and a torque limiter and a one-way clutch connected in parallel between the first shaft and the second shaft, wherein, the one-way clutch is set in a direction of idling when the vehicle moves forward and is set to engage when the vehicle moves backward, and the torque limiter functions when the vehicle moves forward and does not function when the vehicle moves backward.

As described above, the transaxle is advantageous in that the torque can sufficiently be transmitted by the operation of the one-way clutch when the large torque is applied to the transaxle of the front wheels during the backward movement.

In addition, the transaxle is advantageous in that the connection and the disconnection of the first shaft and the torque limiter can be switched.

These and other features and advantageous effects will become apparent from the following detailed description of the invention with reference to the accompanying drawings.

BRIEF DESCRIPTION OF THE DRAWINGS

Hereinafter, some embodiments will be described with reference to the accompanying drawings, but the embodiments and the drawings are merely examples, and should not be construed in a limiting sense. In some drawings, the same elements are denoted with the same reference numerals.

DETAILED DESCRIPTION

A transaxle according to a first embodiment will be described with reference to FIG. 1 to FIGS. 3A and 3B. The transaxle of the first embodiment is applied as a front transaxle 15 in a vehicle 1 that is a four-wheel drive type all-terrain vehicle. The transaxle receives power from a transmission shaft extending forward from a rear portion of the vehicle 1, and transmits the power to front wheels through an axle shaft that is an output shaft of the front transaxle 15.

Figure 1:
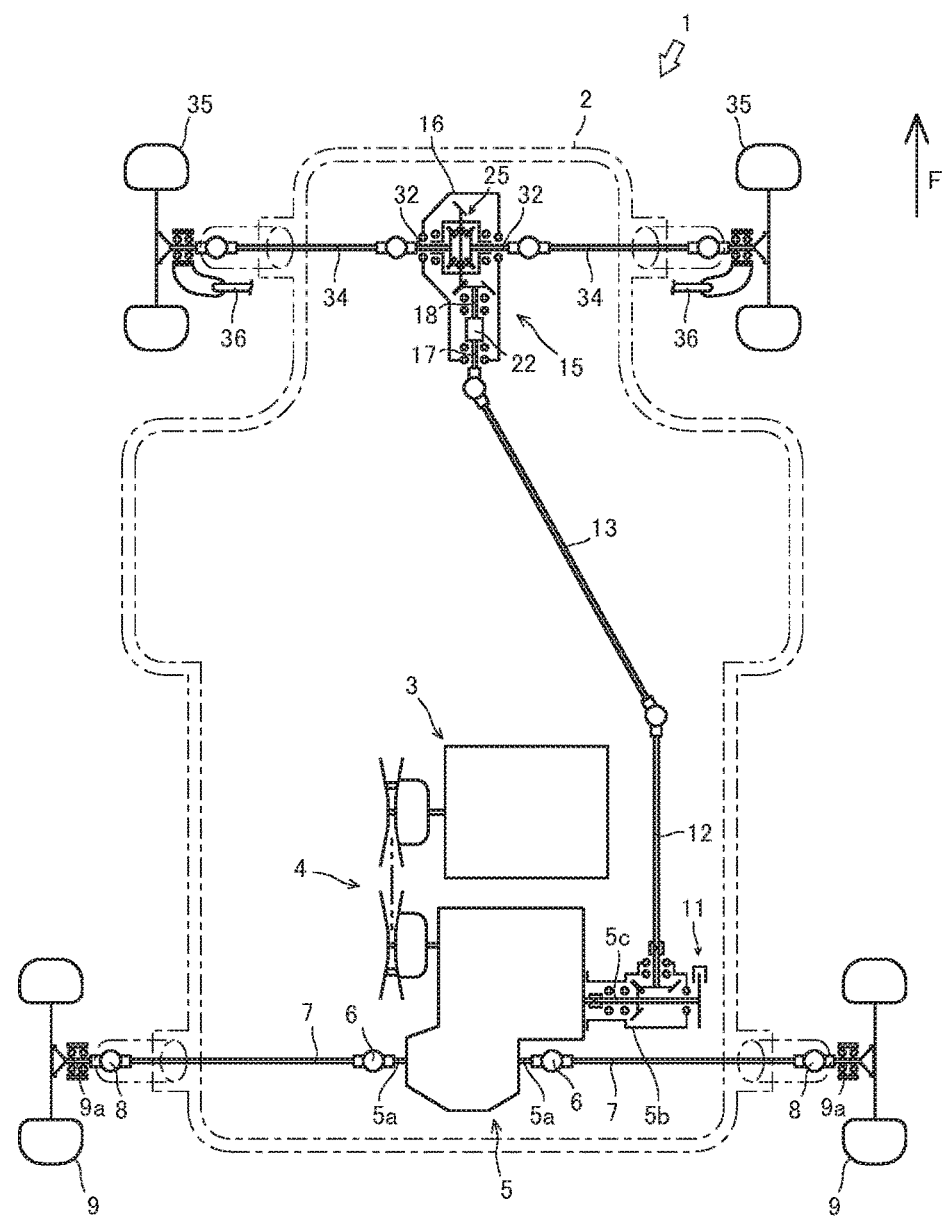
FIG. 1 is a schematic plan view of an entire vehicle provided with a transaxle.

As illustrated in FIG. 1, it is assumed that the vehicle 1 is disposed facing forward in a direction indicated by an arrow F. That is, the term of "from front to rear" or "forward and backward" is assumed to mean a longitudinal direction of the vehicle 1, and the term of "from side to side" or "right and left" is assumed to mean a transverse direction of the vehicle 1.

The entire vehicle 1 will be described with reference to FIG. 1. A vehicle body frame (chassis) 2 extends from a front end to a rear end of the vehicle 1, an engine 3 is supported in a rear portion of the vehicle body frame 2, and a rear transaxle 5 is supported behind the engine 3. A transmission 4 is interposed between the engine 3 and the rear transaxle 5. Therefore, rotating power of the engine 3 is continuously changed by the transmission 4, and transmitted to the rear transaxle 5.

A forward and backward switching mechanism (not illustrated) and a differential mechanism (not illustrated) are provided in the rear transaxle 5. The differential mechanism distributes the power received from the forward and backward switching mechanism to right and left output shafts 5a and 5a. Each of the right and left output shafts 5a and 5a is linked to an axle 9a of each of right and left rear wheels 9 suspended at each of right and left ends in the rear portion of the body frame 2, via a constant velocity free joint 6, a transmission shaft 7 and a universal joint 8.

A PTO (Power Take-Off) housing 5b is formed on a right side of the rear transaxle 5. A PTO mechanism is formed inside the PTO housing 5b while a counter shaft 5c, which is an output shaft of the forward and backward switching mechanism, is linked to a transmission shaft 12 by a PTO bevel gear. An end of the counter shaft 5c protrudes from the PTO housing 5b, and a parking brake 11 is provided at this protruding end.

Thus, in the rear transaxle 5, the rotating power driven by the engine 3 via the transmission 4 is divided into the differential mechanism for driving the right and left rear wheels 9 and the PTO for driving right and left front wheels 35 (to be described later).

A front transaxle 15 is supported in the front portion of the body frame 2, and a first shaft 17 of an input shaft S1 protrudes backward from an axle housing 16 of the front transaxle 15 in a central portion in the transverse direction of the body frame 2. A transmission shaft 13 is interposed between the front end of the transmission shaft 12 and the rear end of the first shaft 17 via universal joints, whereby the power is transmitted from the PTO to the first shaft 17 through the transmission shafts 12 and 13.

The input shaft S1 constructed with the first shaft 17 and a second shaft 18, a torque limiter 22 and the like are accommodated in the rear portion of the axle housing 16 of the front transaxle 15. The second shaft 18 extends coaxially in front of the first shaft 17. The torque limiter 22 is interposed between the first shaft 17 and the second shaft 18 in a middle portion of the input shaft S1, and normally connects the first shaft 17 and the second shaft 18 so as to be relatively non-rotatable. A differential gear 25 having a usual bevel gear structure is accommodated in the front portion of the axle housing 16. The differential gear 25 connects right and left differential yoke shafts 32 and 32 that are output shafts so as to be differentially movable.

The right and left differential yoke shafts 32 protrude to the right and left while being rotatably supported by the axle housing 16. The differential yoke shafts 32 are connected to the right and left front wheels 35 suspended at the right and left ends of the front portion of the body frame 2, via the transmission shafts 34. The right and left front wheels 35 that are steering wheels are linked to each other via a tie rod 36 such that the right and left front wheels 35 can turn right and left together relative to the vehicle body frame 2.

A specific embodiment of the front transaxle 15 applied to the vehicle 1 as illustrated in FIG. 1 will be described with reference to FIG. 2. The axle housing 16 is constructed by joining a main housing member 16a, a side cover member 16b, and an input shaft housing member 16c. A main part of the differential gear 25 is accommodated in the front portion of the main housing member 16a, and one (in the first embodiment, the right differential yoke shaft 32) of the right and left differential yoke shafts 32 is axially supported at one (in the first embodiment, the right side portion) of the front right and left sides of the main housing member 16a with one bearing 33 interposed therebetween.

The other (in the first embodiment, the left side portion) of the front right and left sides of the main housing member 16a is opened, and the differential gear 25 can be taken in and out from the main housing member 16a through this opening. The side cover member 16b is joined to the main housing member 16a so as to cover the opening, and the other differential yoke shaft 32 (in the first embodiment, the left differential yoke shaft 32) is axially supported at the side cover member 16b with the other bearing 33 interposed therebetween.

The differential gear 25 includes a differential case formed by joining right and left differential case members 27 and 28. A flange 27a is formed on the differential case member 27, and a bevel ring gear 26 is fixed to the flange 27a. The differential case members 27 and 28 are fitted in the differential yoke shafts 32, respectively. The differential case members 27 and 28 and the differential yoke shafts 32 are axially supported by the main housing member 16a and the side cover member 16b with the bearings 33 interposed therebetween.

A differential pinion shaft 29 is sandwiched between the differential case members 27 and 28, and bevel differential pinions 30 are provided on the differential pinion shaft 29 in the differential case. In the differential case, bevel differential side gears 31 are fixed to inner ends of the differential yoke shafts 32, and the bevel differential pinions 30 are engaged with the right and left bevel differential side gears 31 at the right and left sides.

The main housing member 16a is provided with an opening at the rear end, and the input shaft housing member 16c is joined to the rear end of the main housing member 16a so as to close the opening. The front portion of the input shaft housing member 16c is fitted in the opening at the rear end of the main housing member 16a. The inside of the input shaft housing member 16c is configured as a torque limiter chamber 16d in which the torque limiter 22 (to be described later) and the like are accommodated. A hole 16e is made open in a left side surface of the input shaft housing member 16c in order to assemble the torque limiter 22 and the like therein. The hole 16e is closed with a lid member 16f, and the lid member 16f is fixed to the input shaft housing member 16c with a fixture such as a bolt (not illustrated). The input shaft housing member 16c rotatably supports the input shaft S1 including the first shaft 17 and the second shaft 18. Specifically, the rear end of the input shaft housing member 16c axially supports a middle portion in an axial direction of the first shaft 17 with the bearings 21 and 21 interposed therebetween, and a rear portion that is one end of the first shaft 17 protrudes from the rear end of the input shaft housing member 16c.

In the rear portion of the main housing member 16a and the front portion of the input shaft housing member 16c, the second shaft 18 extending in the longitudinal direction of the vehicle 1 is axially supported on the front end side of the first shaft 17 on the same axis as the first shaft 17 with front and rear bearings 19 and 20 interposed therebetween. A bevel pinion 18*b* is formed at (or fixed to) the front end of the second shaft 18. The bevel pinion 18*b* protrudes from the front end of the input shaft housing member 16*c* into the main housing member 16*a*, and is engaged with the rear end of the bevel ring gear 26. Thus, the second shaft 18 is connected to the differential gear 25, and linked to the differential yoke shaft 32 that is the output shaft of the front transaxle 15 via the differential gear 25.

In the torque limiter chamber 16*d*, the torque limiter 22 that is the middle portion of the input shaft S1 is interposed between the front end, which is the other end of the first shaft 17, and the rear end, which is the other end of the second shaft 18. The torque limiter 22 is constructed by press-fitting the front end of an input unit 22A that is a rod-shape member into a driven unit 22B that is a tubular member. An arrangement position is decided by adjusting the number of spacers 22*s* disposed on the front and rear sides of the driven unit 22B.

Figures 3A, 3B:
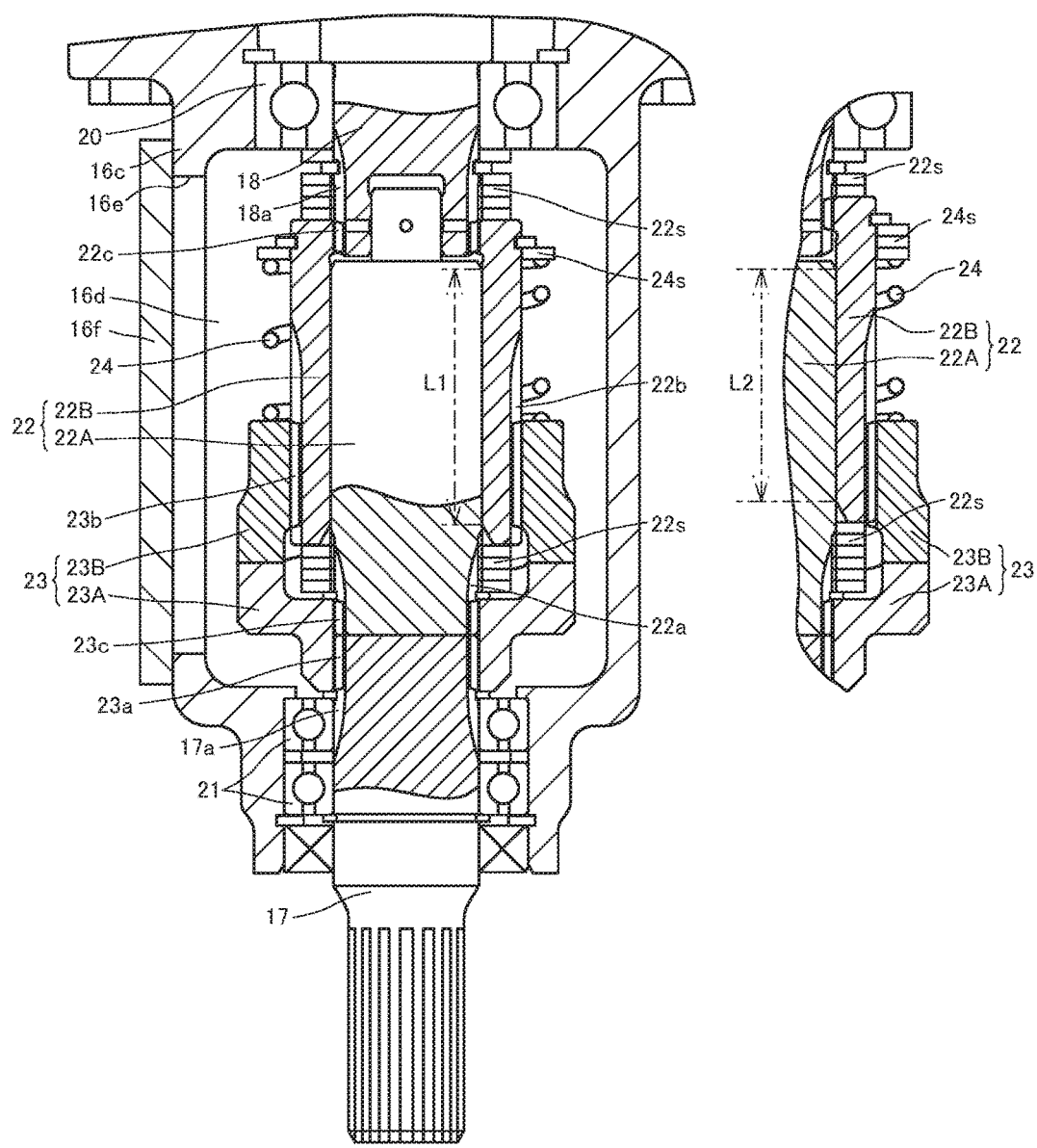
FIG. 3A is a sectional view illustrating an arrangement state of a one-way clutch in the transaxle.
FIG. 3B is a sectional view illustrating another arrangement state of the one-way clutch in the transaxle.

The input unit 22A of the torque limiter 22 and the first shaft 17 are connected to each other so as to be relatively non-rotatable. Specifically, a spline groove 17*a* is formed in an outer peripheral surface at the front end of the first shaft 17, and a spline groove 22*a* is also formed in an outer peripheral surface at the rear end of the input unit 22A. As illustrated in FIG. 3A, the front end of the first shaft 17 and the rear end of the input unit 22A are inserted in a cylindrical input clutch 23A constituting a one-way clutch 23. Spline keys 23*a* and 23*c* are formed on the inner peripheral surface of the input clutch 23A, the spline key 23*a* is spline-fitted to the spline groove 17*a* of the first shaft 17, and a spline key 23*c* is spline-fitted to the spline groove 22*a* of the input unit 22A, whereby the first shaft 17 and the input unit 22A are connected to the input clutch 23A so as to be relatively non-rotatable.

On the other hand, the driven unit 22B of the torque limiter 22 and the second shaft 18 are connected to each other so as to be relatively non-rotatable. Specifically, a spline groove 18*a* is formed in the outer peripheral surface at the rear end of the second shaft 18, and a spline key 22*c* is formed in the outer peripheral surface at the front end of the driven unit 22B. As illustrated in FIG. 3A, the rear end of the second shaft 18 is inserted in the front end of the driven unit 22B, the spline key 22*c* of the driven unit 22B is spline-fitted in the spline groove 18*a* of the second shaft 18, whereby the second shaft 18 and the driven unit 22B are connected to each other so as to be relatively non-rotatable.

The torque limiter 22 exerts a function by press-fitting the input unit 22A in the driven unit 22B. Specifically, the input unit 22A and the driven unit 22B do not relatively rotate when a torque difference that is a difference between a torque transmitted from the first shaft 17 to the input unit 22A and a torque transmitted from the second shaft 18 to the driven unit 22B is less than or equal to a predetermined value (when frictional force generated between the outer peripheral surface of the input unit 22A and the inner peripheral surface of the driven unit 22B is less than or equal to a maximum static frictional force). Therefore, the second shaft 18 does not rotate relative to the first shaft 17, and the second shaft 18 and the first shaft 17 are maintained at the same rotation speed.

On the other hand, when the torque difference that is the difference between the torque transmitted from the first shaft 17 to the input unit 22A and the torque transmitted from the second shaft 18 to the driven unit 22B is larger than the predetermined value (when the frictional force generated between the outer peripheral surface of the input unit 22A and the inner peripheral surface of the driven unit 22B exceeds the maximum static frictional force), slippage is generated between the outer peripheral surface of the input unit 22A and the inner peripheral surface of the driven unit 22B, and the relative rotation is generated between the second shaft 18 and the first shaft 17. In this case, the second shaft 18 rotates relative to the first shaft 17, and the second shaft 18 and the first shaft 17 are different from each other in the rotation number. Thus, the torque limiter 22 has the configuration in which the input unit 22A is press-fitted in the driven unit 22B, whereby the torque is transmitted between the input unit 22A and the driven unit 22B while being limited to a predetermined value or less.

Due to the configuration as described above in the front transaxle 15 of the first embodiment, when the torque received from the differential gear 25 by the second shaft 18 increases, the input unit 22A and the driven unit 22B can relatively rotate. Therefore, the front transaxle 15 has a configuration in which the first shaft 17 and a power system on the upstream side of the first shaft 17 are protected from a counter-flow load applied to the second shaft 18.

In other words, when an excessive load is applied to the front wheels 35 of the vehicle 1 provided with the front transaxle 15 including the torque limiter 22, the vehicle 1 is momentarily automatically brought into a two-wheel drive state, and the power system including the engine 3, the transmission 4, and the rear transaxle 5 is protected from the load applied to the front transaxle 15 from the front wheels 35. Therefore, a forward peak torque generated during a jump of the vehicle 1 or the like can be released.

In addition, the front transaxle 15 of the first embodiment has the configuration in which the input unit 22A and driven unit 22B of the torque limiter 22 are connected to each other by the one-way clutch 23. Specifically, a spline groove 22*b* is formed in the outer peripheral surface at the rear end of the driven unit 22B of the torque limiter 22, and a spline key 23*b* is formed in the inner peripheral surface of a cylindrical driven clutch 23B constituting the one-way clutch 23.

As illustrated in FIG. 3A, the driven unit 22B is inserted in the driven clutch 23B of the one-way clutch 23, and the spline key 23*b* is spline-fitted in the spline groove 22*b*, whereby the driven unit 22B of the torque limiter 22 and the driven clutch 23B of the one-way clutch 23 are connected to each other so as to be relatively non-rotatable. The driven clutch 23B is biased forward by a spring 24. On the other hand, because the input unit 22A of the torque limiter 22 and the input clutch 23A of the one-way clutch 23 are connected to each other so as to be relatively non-rotatable as described above, the input unit 22A and the driven unit 22B are connected to each other by the one-way clutch 23.

Figure 2:
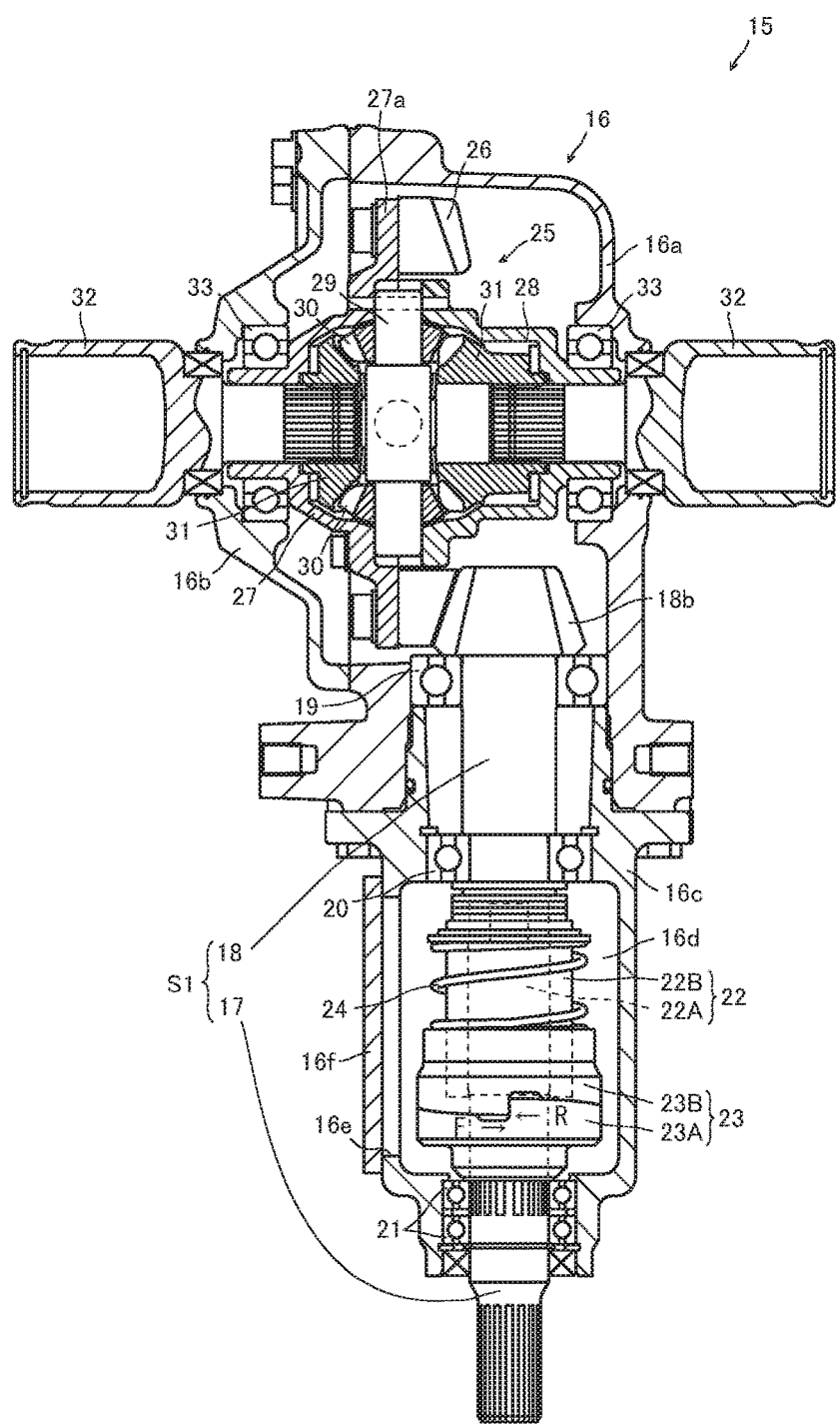
FIG. 2 is a sectional plan view of the transaxle according to a first embodiment.

As illustrated in FIG. 2, the input clutch 23A and driven clutch 23B of the one-way clutch 23 are not engaged with each other when the rotation direction of the first shaft 17 is a forward direction (the direction of the arrow F in FIG. 2) that is the first direction. Therefore, when the vehicle 1 moves forward, the second shaft 18 can rotate relative to the first shaft 17.

On the other hand, the input clutch 23A and driven clutch 23B of the one-way clutch 23 are engaged with each other when the rotation direction of the first shaft 17 is a backward direction (the direction of an arrow R in FIG. 2) that is the second direction. Therefore, when the vehicle 1 moves backward, the second shaft 18 cannot rotate relative to the first shaft 17. Thus, in the first embodiment, the torque limiter 22 can be prevented from being actuated even when a large torque is applied to the front transaxle 15 of the right and left front wheels 35 in the case where the vehicle 1 performs a climb or towing in the backward direction. According to the front transaxle 15 of the first embodiment, in the case where the vehicle 1 performs the climb or towing in the backward direction, the torque can sufficiently be transmitted by operating the one-way clutch 23.

The torque limiter 22 of the first embodiment can adjust a length L of the input unit 22A press-fitted in the driven unit 22B. Specifically, as illustrated in FIGS. 3A and 3B, the longitudinal position of the driven unit 22B is changed by changing the number of the spacers 22s disposed on the front and rear sides of the driven unit 22B. In this case, the relative position between the driven clutch 23B and the spring 24 is unchanged by increasing the number of spring spacers 24s defining the position of the spring 24.

Therefore, a length L2 of the input unit 22A press-fitted in the driven unit 22B is shorter than a length L1 of the input unit 22A press-fitted in the driven unit 22B in FIG. 3A. For this reason, in the front transaxle 15 of FIG. 3B, the predetermined value of the torque difference (the maximum static frictional force between the outer peripheral surface of the input unit 22A and the inner peripheral surface of the driven unit 22B) that is a threshold at which the input unit 22A and the driven unit 22B rotate relatively can be reduced compared with the front transaxle 15 of FIG. 3A.

Next, a front transaxle according to a second embodiment will be described below with reference to FIG. 4. The front transaxle of the second embodiment includes an input shaft S2 constructed with a first shaft 117 and the second shaft 18. The front transaxle of the second embodiment is substantially the same as the front transaxle 15 of FIG. 1 to FIGS. 3A and 3B, except that a clutch (a clutch cylinder 41 and a spherical member 42) that switches between connection and disconnection of the first shaft 117 and the input unit 22A of the torque limiter 22 is interposed between the first shaft 117 and the torque limiter 22 in the input shaft housing member 16c. Therefore, the same configuration as the first embodiment is designated by the same reference numeral, and the detailed description will be omitted.

The clutch is constructed with the clutch cylinder 41 and the spherical member 42. The clutch cylinder 41 is a tubular member into which a rear portion of an input clutch 123A of a one-way clutch 123 is inserted. The clutch cylinder 41 is configured to be movable in the longitudinal direction along the outer peripheral surface of the input clutch 123A. A groove 41a is formed on the front side of the inner peripheral surface of the clutch cylinder 41. A hole 123a is made open in the input clutch 123A of the second embodiment, and the spherical member 42 is accommodated in the hole 123a. A groove 117a in which the spherical member 42 can advance and retract is formed in the outer peripheral surface at the front end of the first shaft 117 constituting the input shaft S2 of the second embodiment.

The spline groove 22a is formed in the outer peripheral surface at the rear end of the input unit 22A of the torque limiter 22, and the rear end of the input unit 22A is inserted into the input clutch 123A of the one-way clutch 123. The spline key 23c is formed in the inner circumferential surface of the input clutch 123A, and spline-fitted in the spline groove 22a of the input unit 22A, whereby the input unit 22A and the input clutch 123A are connected to each other so as to be relatively non-rotatable.

Figure 4:
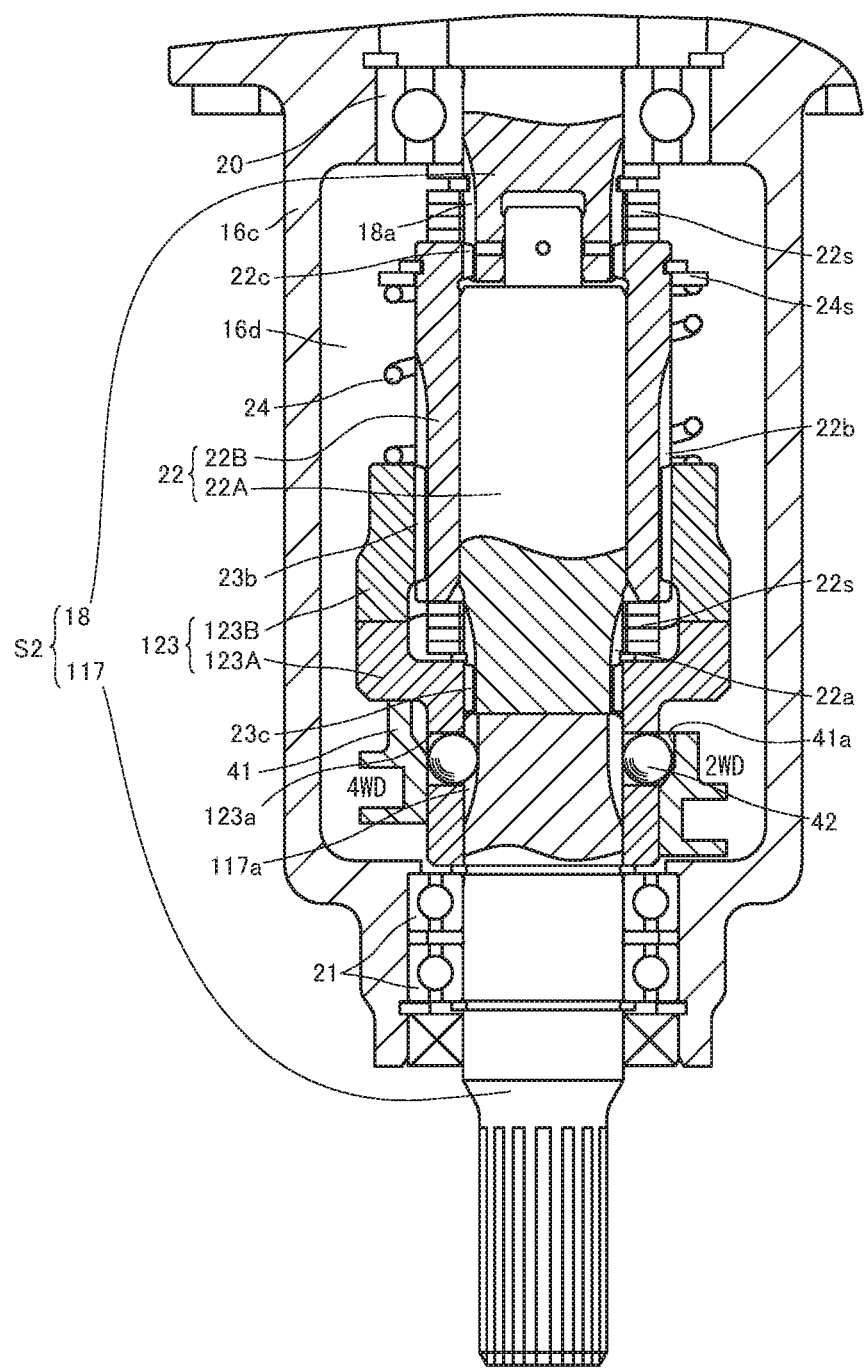
FIG. 4 is a sectional view illustrating an arrangement state of a one-way clutch in a transaxle according to a second embodiment.

With the configuration as described above, when the clutch cylinder 41 is advanced as illustrated on the left side (the side denoted by 4WD) in FIG. 4, the spherical member 42 is inserted into the groove 117a of the first shaft 117. Therefore, the input clutch 123A and the first shaft 117 are connected to each other so as to be relatively non-rotatable, and the input unit 22A of the torque limiter 22 and the first shaft 17 are connected to each other so as to be relatively non-rotatable. That is, the first shaft 117 and the input unit 22A of the torque limiter 22 are connected to each other so as to be relatively non-rotatable.

On the other hand, when the clutch cylinder 41 is retracted as illustrated on the right side (the side denoted by 2WD) in FIG. 4, the spherical member 42 retreats to the groove 41a of the clutch cylinder 41. Therefore, the input clutch 123A and the first shaft 117 are connected to each other so as to be relatively rotatable, and the input unit 22A of the torque limiter 22 and the first shaft 17 are connected to each other so as to be relatively rotatable. That is, the first shaft 117 and the input unit 22A of the torque limiter 22 are disconnected.

As described above, the transaxle of the second embodiment can switch between the connection and the disconnection of the first shaft 117 and the torque limiter 22. Therefore, the vehicle 1 can be used as the four-wheel drive vehicle when the first shaft 117 and the torque limiter 22 are connected to each other, and the vehicle 1 can be used as the two-wheel drive vehicle when the first shaft 117 and the torque limiter 22 are disconnected from each other.

Next, a front transaxle according to a third embodiment will be described below with reference to FIG. 5. The front transaxle of the third embodiment includes an input shaft S3 constructed with a first shaft 217 and the second shaft 18. The front transaxle of the third embodiment is substantially the same as the front transaxle 15 of FIG. 1 to FIGS. 3A and 3B, except that a connection state between the first shaft 217 and the second shaft 18 is different in the input shaft housing member 16c. Therefore, the same configuration as the first embodiment is designated by the same reference numeral, and the detailed description will be omitted.

In the torque limiter chamber 16d, a torque limiter 222 that is the middle portion of the input shaft S3 is interposed between the front end, which is the other end of the first shaft 217, and the rear end, which is the other end of the second shaft 18. The torque limiter 222 includes an input unit 222A that is a rod-shape member, a plurality of first friction plates 222c that are provided in the outer peripheral surface of the input unit 222A to be relatively non-rotatable, a driven unit 222B that is a tubular member, a plurality of second friction plates 222d that are provided alternately with the first friction plates 222c in the inner peripheral surface of the driven unit 222B to be relatively non-rotatable, and a disc spring 224 that presses the first friction plates 222c and the second friction plates 222d in a thickness direction.

Specifically, a spline groove 217a is formed in the outer peripheral surface of the input unit 222A, and is engaged with a spline key (not illustrated) of the first friction plate 222c, whereby the input unit 222A and the first friction plate 222c are assembled so as to be relatively non-rotatable. In addition, a spline groove 222b is formed in the inner peripheral surface of the driven unit 222B, and is engaged with a spline key (not illustrated) of the second friction plate 222d, whereby the driven unit 222B and the second friction plate 222d are assembled so as to be relatively non-rotatable. The first friction plate 222c and the second friction plate 222d are pressed in a thickness direction by a disc spring 224, whereby a large frictional resistance is generated when the first friction plate 222c and the second friction plate 222d rotate relatively. That is, a torque greater than a predetermined value is required to relatively rotate the input unit 222A and the driven unit 222B.

In the front transaxle of the third embodiment, a clutch member 241 that switches between the connection and the disconnection of the first shaft 217 and the input unit 222A of the torque limiter 222 is interposed between the first shaft 217 and the torque limiter 222 in the input shaft housing member 16c.

The clutch member 241 is a tubular member in which a spline key 241a is formed in the inner peripheral surface of the clutch member 241. The clutch member 241 is configured to be movable in the longitudinal direction along the input unit 222A and the outer peripheral surface of the first shaft 217. A spline groove 217a is formed in the outer peripheral surface at the front end of the first shaft 217.

Figure 5:
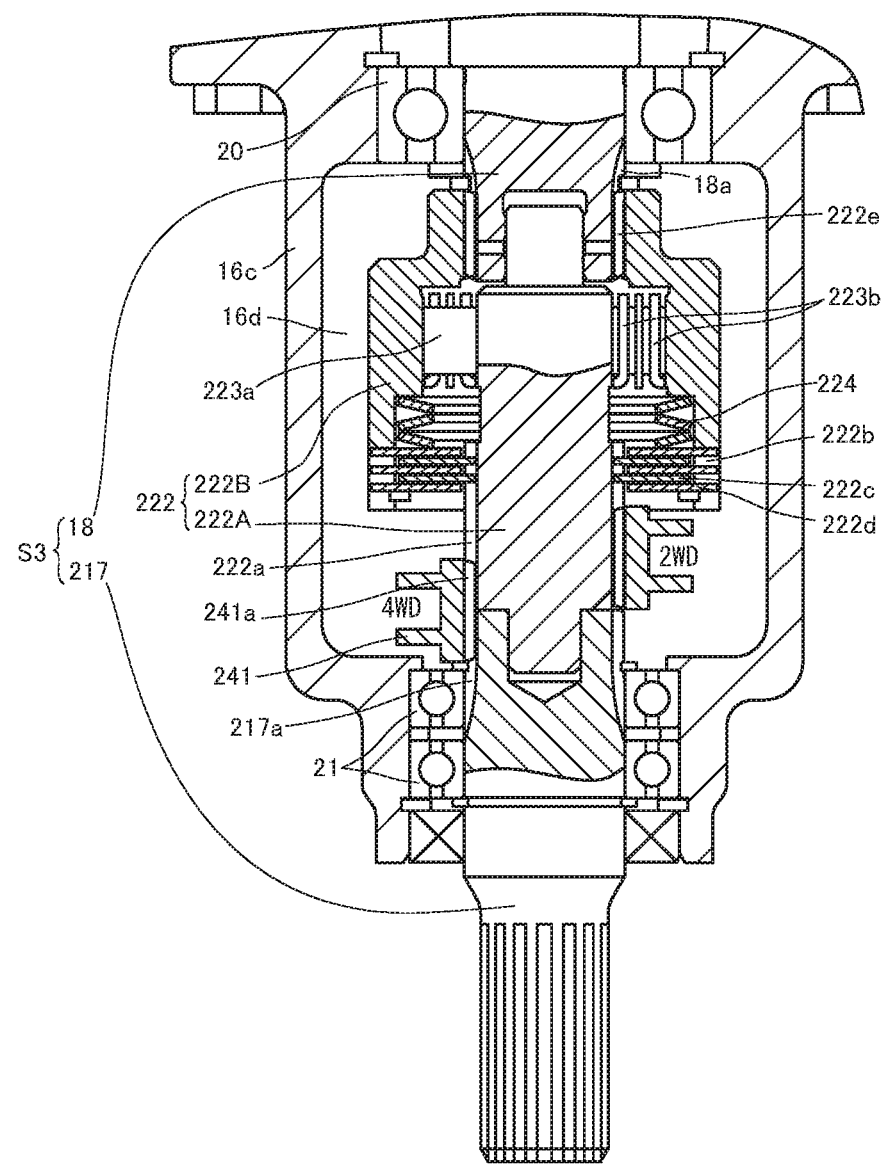
FIG. 5 is a sectional view illustrating an arrangement state of a one-way clutch in a transaxle according to a third embodiment.

With the configuration as described above, when the clutch member 241 is retracted as illustrated on the left side (the side denoted by 4WD) in FIG. 5, the spline key 241a of the clutch member 241 is spline-fitted in both the spline groove 217a of the first shaft 217 and the spline groove 217a of the input unit 222A. Therefore, the input unit 222A and the first shaft 217 are connected to each other so as to be relatively non-rotatable.

On the other hand, when the clutch member 241 is advanced as illustrated on the right side (the side denoted by 2WD) in FIG. 5, the spline key 241a of the clutch member 241 is not spline-fitted in the spline groove 217a of the first shaft 217, but spline-fitted only in the spline groove 217a of the input unit 222A. Therefore, the input unit 222A and the first shaft part 217 are disconnected.

As described above, the transaxle of the third embodiment can switch between the connection and the disconnection of the first shaft 217 and the torque limiter 222. Therefore, the vehicle can be used as the four-wheel drive vehicle when the first shaft 217 and the torque limiter 222 are connected to each other, and the vehicle can be used as the two-wheel drive vehicle when the first shaft 217 and the torque limiter 222 are disconnected from each other.

On the other hand, the driven unit 222B of the torque limiter 222 and the second shaft 18 are connected to each other so as to relatively non-rotatable. Specifically, the spline groove 18a is formed in the outer peripheral surface at the rear end of the second shaft 18, and a spline key 222e is formed in the outer peripheral surface at the front end of the driven unit 222B. As illustrated in FIG. 5, the rear end of the second shaft 18 is inserted into the front end of the driven unit 222B, the spline key 222e of the driven unit 222B is spline-fitted in the spline groove 18a of the second shaft 18, whereby the second shaft 18 and the driven unit 222B are connected to each other so as to be relatively non-rotatable.

The torque limiter 222 exerts its function by interposing a plurality of first friction plates 222c and a plurality of second friction plates 222d between the input unit 222A and the driven unit 222B. Specifically, the input unit 222A and the driven unit 222B do not relatively rotate when a torque difference that is a difference between a torque transmitted from the first shaft 217 to the input unit 222A and a torque transmitted from the second shaft 18 to the driven unit 222B is less than or equal to a predetermined value (when frictional force generated between the first friction plates 222c and the second friction plates 222d is less than or equal to a maximum static frictional force). Therefore, the second shaft 18 does not rotate relative to the first shaft 217, and the second shaft 18 and the first shaft 217 are maintained at the same rotation speed. Thus, the torque limiter 222 has the configuration in which the plurality of first friction plates 222c and the plurality of second friction plates 222d are inserted between the input unit 222A and the driven unit 222B, whereby the torque is transmitted between the input unit 222A and the driven unit 222B while being limited to a predetermined value or less.

On the other hand, when the torque difference that is a difference between a torque transmitted from the first shaft 217 to the input unit 222A and a torque transmitted from the second shaft 18 to the driven unit 222B is larger than a predetermined value (when frictional force generated between the first friction plate 222c and the second friction plate 222d exceeds a maximum static frictional force), the slippage is generated between the first friction plate 222c and the second friction plate 222d, so that the relative rotation is generated. In this case, the second shaft 18 rotates relative to the first shaft 217, and the second shaft 18 and the first shaft 217 are different from each other in the rotation number.

Due to the configuration as described above in the front transaxle of the third embodiment, the input unit 222A and the driven unit 222B can relatively rotate when the torque received from the differential gear by the second shaft 18 increases, so that the first shaft 217 and the power system on the upstream side of the first shaft 217 are protected from the counter-flow load applied to the second shaft 18. In other words, when an excessive load is applied to the front wheels of the vehicle equipped with the front transaxle including the torque limiter 222, the vehicle is momentarily automatically brought into the two-wheel drive state, and the power system including the engine, the transmission, and the rear transaxle is protected from the load applied to the front transaxle from the front wheels. Therefore, a forward peak torque generated during a jump of the vehicle or the like can be released.

In addition, the front transaxle of the third embodiment has the configuration in which the input unit 222A and driven unit 222B of the torque limiter 222 are connected to each other by a sprag type one-way clutch. Specifically, the one-way clutch includes a sprag 223a and an annular retainer 223b, and the sprag 223a and the annular retainer 223b are inserted between the outer peripheral surface of the input unit 222A and the inner peripheral surface of the driven unit 222B. Therefore, the sprags 223a are engaged with each other to transmit a torque when the input unit 222A and the driven unit 222B relatively rotate in one direction. When the input unit 222A and the driven unit 222B rotate in the directions opposite to each other, the engagement of the sprags 223a is released and the torque is not transmitted.

The one-way clutch of the third embodiment is configured not to be engaged when the rotation direction of the first shaft 217 is the forward direction that is the first direction. Therefore, when the vehicle moves forward, the second shaft 18 can rotate relative to the first shaft 217.

On the other hand, the one-way clutch of the third embodiment is configured to be engaged when the rotation direction of the first shaft 217 is the backward direction that is the second direction. Therefore, when the vehicle moves backward, the second shaft 18 cannot rotate relative to the first shaft 217. Thus, in the third embodiment, the torque limiter 222 can be prevented from being actuated even when a large torque is applied to the front transaxle of the right and left front wheels in the case where the vehicle performs a climb or towing in the backward direction. According to the front transaxle of the third embodiment, in the case where the vehicle performs the climb or towing in the backward direction, the torque can sufficiently be transmitted by operating the one-way clutch.

The above embodiments are recommended examples of the disclosed device, and it should be understood by those skilled in the art that various modifications and applications of the present invention can be made without departing from the scope defined in the following claims.

What is claimed is:

1. A transaxle comprising:
an axle housing;
a pair of output shafts rotatably supported by the axle housing;
an input shaft comprising:
a first shaft rotatably supported by the axle housing, a first end of the first shaft protruding from the axle housing, and
a second shaft rotatably supported by the axle housing at a second end of the first shaft on an axis line identical to that of the first shaft, a first end of the second shaft, which is an end opposite to the first shaft, being connected to the output shafts; and
a torque limiter comprising:
an input unit inserted in a middle position of the input shaft in the axle housing, and connected to the second end of the first shaft so as to be relatively non-rotatable,
a driven unit connected to a second end of the second shaft so as to be relatively non-rotatable, and
a region transmitting a torque between the input unit and the driven unit while limiting the torque to a predetermined value or less,
wherein, by connecting the input unit and the driven unit with a one-way clutch, the second shaft is rotatable relative to the first shaft when a rotation direction of the first shaft is a first direction, and the second shaft is non-rotatable relative to the first shaft when the rotation direction is a second direction opposite to the first direction.

2. The transaxle according to claim 1, wherein, in the axle housing, a clutch that switches between connection and disconnection of the first shaft and the torque limiter is interposed between the first shaft and the torque limiter.

3. A transaxle for a vehicle comprising:
an axle housing;
a pair of output shafts rotatably supported by the axle housing;
an input shaft comprising:
a first shaft rotatably supported by the axle housing, a first end of the first shaft protruding from the axle housing, and
a second shaft rotatably supported by the axle housing at a second end of the first shaft on an axis line identical to that of the first shaft, a first end of the second shaft, which is an end opposite to the first shaft, being connected to the output shafts; and
a torque limiter and a one-way clutch connected in parallel between the first shaft and the second shaft, wherein,
the one-way clutch is set to disengage when the vehicle moves forward and is set to engage when the vehicle moves backward, and the torque limiter functions when the vehicle moves forward and does not function when the vehicle moves backward.

* * * * *